United States Patent Office 3,460,593
Patented Aug. 12, 1969

3,460,593
CUP DISPENSING DEVICE ESPECIALLY FOR AUTOMATIC BEVERAGE DISPENSING APPARATUS
Wolfgang Niehaus, Hamburg-Neugraben, and Alexander Kückens, Palmerstr. 9, Hamburg 26, Germany; said Niehaus assignor to said Kückens
Filed July 15, 1966, Ser. No. 565,542
Claims priority, application Germany, July 19, 1965, K 56,652
Int. Cl. B65b 43/42, 35/56
U.S. Cl. 141—372                                          6 Claims

ABSTRACT OF THE DISCLOSURE

A device for transporting and orienting paper cups from a cup reservoir to a liquid dispensing means consisting of three elongated elements, two of which support the lip of the cup, and the third supporting the cup bottom, the cup bottom being unsupported while the cup is maintained in the filling position wherein proper orientation of the cup to the filling device is assured, and cup receiving means are located below the guide cup retaining means to receive the filled cup, and pivot the filled cup to an accessible location.

---

Figure 1:
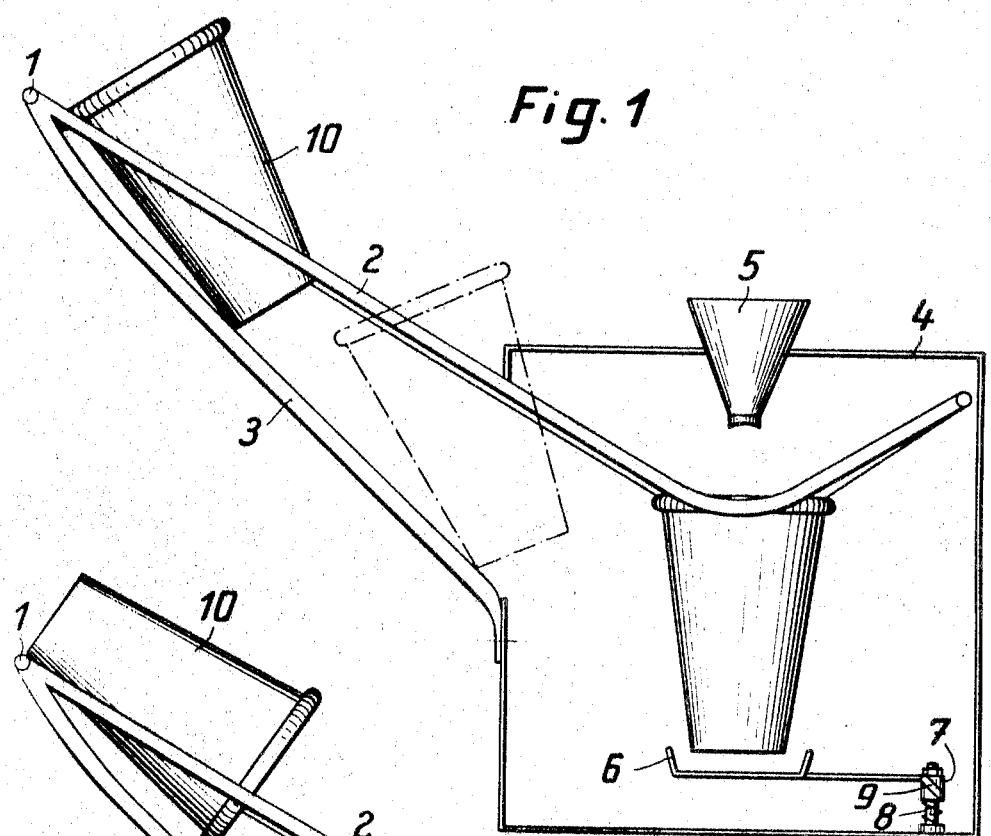

Modern cup dispensing devices, especially in automatic beverage dispensing apparatus, in general, consist of several columns of cups. These columns of cups are disposed side by side or are arranged about an axis. Such cups are ejected from the individual columns by a special device and an electric motor or electromagnetic drive. Subsequent to this ejection, the cups fall into a so-called chute for cups or a channel for cups, respectively, which is generally of a semi-spherical shape. In these so-called chutes, the cup slides to the dispensing or filling station in an oblique attitude. It is possible, in particular with oblique disposed slide tracks, that after ejection, the bottom of the cup does not impinge exactly centrally but laterally and thereby rebounds, in which case it may also happen that the cup arrives at the dispensing station upside-down. The rebound of the cup may also cause delays in time. If the cup reaches the dispensing station, it is necessary that lateral or countersunk guides be provided at this place which at any rate guarantee an erect attitude of the cup. When the cup has been filled, a patron must loosen it from the holder or the guides, respectively, and remove it by hand. This not only adds to the expenses but it is also possible that the liquid is spilled during this operation, in spite of the guides.

Another, very important disadvantage resides in the fact that because of this manual operation the hand will entirely or partially touch the outlet device which causes a hygienic problem.

The subject matter of the application solves all the above problems, with the entire dispensing device, from an economic standpoint, being adapted to be carried out and still simpler and cheaper.

The fact that the cup when ejected from the column will occasionally be obliquely supported while filling is caused by certain tolerances existing in the rim of the cup and by an oblique spacing between cup to cup when stacked. It is also possible that the space of a certain cup from the next one varies in itself, that means that the space may be greater on the one side than on the other because, for instance, the one cup may be disposed somewhat oblique with respect to the other one. Because of this, it is not always guaranteed that the bottom of each cup touches one and the same spot in the ejection operation.

The invention described in the following eliminates the disadvantages caused by the above mentioned tolerances; the invention starts from the fact that when sliding in the chute the cup is guided only in three places. If one takes into consideration that all the cups are shaped conically, the radius of the bottom being smaller than that of the cup edge, and that the chute is to give the cup a guiding action so as to prevent it from bounding and performing a pendulum movement, then the smaller radius of the cup touches the lower radius of the chute only at one point. Properly, the cup is smoothly sliding, this means that the smaller radius of the bottom of the cup centrally slips along the inner radius of the chute. In order to give the cup another guide location, it is necessary that the chute corresponds approximately to the outer radius of the cup edge, which means that the greater radius of the cup is guided in two points externally and the smaller radius of the bottom of the cup at the inner radius of the chute.

Therefore, the invention does not provide for a chute of the usual type but for a three-point guide which is formed by three tracks, said tracks forming a triangle. The tracks may have any profile but, suitably, a round member will be selected, bent from a pipe or wire. When the cup is ejected from the dispensing device, the bottom of the cup will find some resistance on the track arranged at the bottom. Owing to the oblique arrangement, now, the bottom will move downwardly, and the two laterally disposed tracks seize the cup by its outer marginal radius. The cup now slides to the place of the dispensing device. Here, the central lower track is terminated early enough for the lower portion of the bottom of the cup to slide off vertically, while the upper cup radius is still retained by the laterally disposed tracks. The cup performs a slight pendulum movement, but as soon as the dispensing operation is started, the weight of the cup will be rapidly increased thus immediately stopping the pendulum movement. This distance of the two outer tracks is adjusted to be such that the rim can no longer hold the full or nearly full cup because the cup is elastic to such a degree that it yields with the full filling weight and thus slips off the lateral guides. The bottom of the culp now slides vertically onto a support which is arranged in such a manner that the tracks now fully release the cup, that the cup might be taken out from the front side of the dispensing machine without overcoming any further resistance or without detaching it from its guiding holders.

If, owing to an error at the cup or in the dispensing device, the cup should tilt over, with its head portion, i.e. with its drinking edge first facing downwardly, then it will re-erect itself in the cup chute because of the feature that the central track is terminated soon enough for the portion of the cup which extends conically towards the bottom of the cup, to tilt over downwardly, while the upper rim is retained by the outer tracks. Now the same operation of oscillating the cup into place and of sliding the cup starts with the dispensing process. It is therefore impossible for the cup to be conveyed into the dispensing or filling station upside-down.

As the filled cup, after having slidingly left the lateral tracks, now is completely free, the invention provides for the weight of the cup to be utilized in the operation of moving a cup supporting plate in the direction towards the dispensing flap or opening. But this process is initiated only when the dispensing flap is lifted thus releasing an arresting arrangement which transports the filled cup in a forward direction. Immediately when the cup has cleared the cup support, the device is returned to its starting position, for instance, by a spring the force of which suffices to retrieve the empty cup support. If, when then the next cup arrives and is filled, then the return biasing force of the spring will again be overcome and the cup support will move again forwardly towards the dispensing flap immdiately upon the latter being slightly lifted thus releasing the arresting arrangement.

Figure 2:
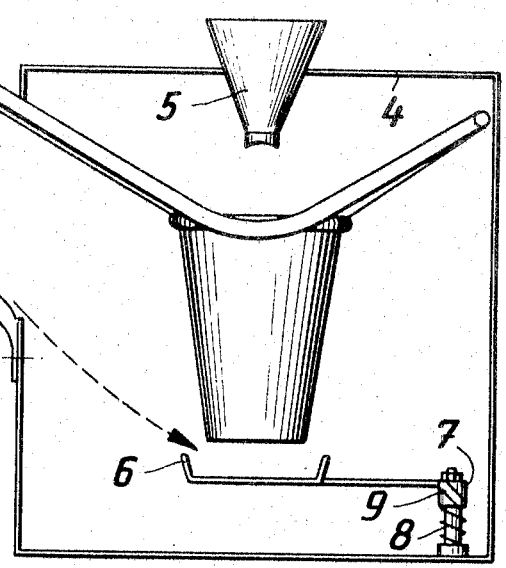

FIG. 1 is an elevational view of a dispensing device in accord with the invention with the cup bottom in the lowermost position, and FIG. 2 shows a similar view where the cup lip enters the guide first.

The cup 10 slides in a direction towards the cup dispensing device with its bottom, i.e. the smaller radius, facing forwardly. 1, 2 and 3 designate the guiding rails, 1 and 2 the two upper rails, 3 the terminated lower rail. The bottom of the cup 10 clears the sliding track 3 at the end thereof, while the greater radius of the drinking cup edge is retained by the sliding tracks 1 and 2. The cup thus performs a pendulum movement in which it adjusts itself axially within the housing with its bottom facing downwardly. 5 designates a discharge funnel; 6 the pivotally arranged intercepting device, 7 designates a rotatably mounted bearing which moves the intercepting device 6 forwardly by an obliquely arranged sliding track 9 when the cup with its filling weight alights on the intercepting device 6. In the empty condition, the spring 8 may again pivot the intercepting device 6 back into the cup receiving position, so that another cup may alight. The two guiding rails 1, 2 are in substantially parallel relationship. The ends of the two guiding rails 1, 2 are connected one to another by transverse rails not shown in a detailed manner. One of the two guiding rails 1, 2 may be vertically arranged a little lower than the other rail for assisting the disengagement of the upper edge of the cup from these tracks when the cup will be charged by the filling liquid.

As shown in FIG. 2 the cup 10 may slide into the housing 4 with its drinking edge facing downwardly, the diameter of which is greater than the distance between the upper sliding rails 1 and 2. Thus, the edge of the drinking cup is again guided by the sliding tracks 1 and 2 as it is impossible for the edge to slip through the rails, while the smaller radius of the bottom again finds support at the sliding track 3. The cup now slides centrally into the housing 4 below the inlet funnel 5 and above the intercepting device 6. The smaller radius of the cup bottom not be supported by track 3 as the funnel 5 is approached and the cups will pivot axially inwardly so that also in this case the same position of the cup is guaranteed as in FIG. 1.

In both cases, now, the filling operation may begin. With a certain amount of filling, the elasticity of the drinking cup edge will cause it to yield, the cup will slide off the sliding tracks 1 and 2 and alight on the intercepting device 6.

It will be recognized that now the cup is no longer impeded by lateral guides when being removed.

In order to safely guarantee that the pivotal movement commences only after the filling process has been finished, provision has been made for an arresting device for the pivotal movement to be released when a flap is lifted. If the cup 10 is being taken out, then the force of the spring 8 will suffice to move the intercepting device back again into the cup receiving position.

What is claimed is:
1. A device for transporting and orienting cups to liquid dispensing means wherein the cups are of a tapered conical configuration having a circular lip diameter and circular bottom diameter, the diameter of said lip being greater than that of said bottom, comprising, in combination, liquid dispensing means, a cup guide obliquely related to the horizontal having a cup receiving portion and a cup retaining portion, said cup retaining portion being disposed below said liquid dispensing means and vertically related below said cup receiving portion, said guide including a pair of elongated elements spaced apart a distance less than the lip diameter of the cup and greater than the cup bottom diameter, a third guide elongated element disposed below and intermediate said pair of elements adapted to support the cup bottom diameter upon a cup lip diameter engaging said pair of elements, said pair of elements extending below said liquid dispensing means and defining said cup retaining portion, said third element including a terminating end terminating short of said cup retaining portion whereby the cup bottom is unsupported when the cup is located in said guide cup retaining portion, the distance separating said cup retaining portion from said third element terminating end being greater than the distance from a cup lip diameter to its bottom diameter permitting a fillable cup orientation at said cup retaining portion regardless of the cup orientation in said guide cup receiving portion.

2. A device for transporting and orienting cups as in claim 1 wherein said elements are related in an inverted triangular relationship transverse to the length of said guide.

3. A device for transporting and orienting cups as in claim 1 wherein said cup retaining portion consists of a V-shaped bend defined in said pair of elements.

4. A device for transporting and orienting cups as in claim 1 wherein one of said pair of elements is disposed slightly lower with respect to a horizontal plane than the other element of said pair to facilitate removal of the cup from said cup retaining portion.

5. A device for transporting and orienting cups as in claim 1 wherein a cup receiving support is located below said cup retaining portion, vertically disposed pivot means supporting said cup receiving support, and cam means defined on said pivot means and support pivoting said support from below said cup retaining portion upon a filled cup being received thereon from said cup retaining portion.

6. In a device for transporting and orienting cups as in claim 5, a spring connected to said support biasing said support upwardly to normally maintain said support below said cup retaining portion.

References Cited
UNITED STATES PATENTS

| 2,095,201 | 10/1937 | Mills | 141—174 |
| 2,580,257 | 12/1951 | Tacchella | 141—174 |
| 2,591,507 | 4/1952 | Brous | 141—174 |

LAVERNE D. GEIGER, Primary Examiner

EDWARD J. EARLS, Assistant Examiner

U.S. Cl. X.R.

141—174; 193—2